US010104510B2

(12) United States Patent
Lee et al.

(10) Patent No.: US 10,104,510 B2
(45) Date of Patent: Oct. 16, 2018

(54) METHOD FOR LOCATING, VIA ULTRA HIGH FREQUENCY, A MOBILE DEVICE FOR "HANDS-FREE" ACCESS TO AN AUTOMOTIVE VEHICLE AND ASSOCIATED LOCATING DEVICE

(71) Applicants: CONTINENTAL AUTOMOTIVE FRANCE, Toulouse (FR); CONTINENTAL AUTOMOTIVE GmbH, Hannover (DE)

(72) Inventors: Jerome Lee, Toulouse (FR); Sylvain Godet, Saint-Cezert (FR); Stephane Billy, Granade (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/246,756

(22) Filed: Aug. 25, 2016

(65) Prior Publication Data

US 2017/0064517 A1    Mar. 2, 2017

(30) Foreign Application Priority Data

Aug. 28, 2015    (FR) ...................... 15 58007

(51) Int. Cl.
*H04W 4/02* (2018.01)
*H04W 4/04* (2009.01)
(Continued)

(52) U.S. Cl.
CPC ........... *H04W 4/046* (2013.01); *G01S 5/0226* (2013.01); *G01S 7/282* (2013.01); *G01S 11/06* (2013.01);
(Continued)

(58) Field of Classification Search
CPC ........ G01S 5/0226; G01S 11/06; G01S 13/74; H04W 4/046; H04W 4/023
(Continued)

(56) References Cited

U.S. PATENT DOCUMENTS

2006/0273887 A1   12/2006   Yamamoto
2008/0204337 A1    8/2008   Takaoka et al.
(Continued)

FOREIGN PATENT DOCUMENTS

CN    1866788    11/2006
CN    101722925    6/2010
(Continued)

OTHER PUBLICATIONS

FR Search Report, dated Apr. 18, 2016, from corresponding FR application.

*Primary Examiner* — Sam Bhattacharya
(74) *Attorney, Agent, or Firm* — Young & Thompson

(57) ABSTRACT

A method for locating, via ultra high frequency, a mobile device (T) for "hands-free" access to a vehicle (V), via a locating device (D') on board the vehicle (V), the locating device (D') including an ultra high frequency transceiver (10'), an electrical power supply source (Vcc) and an antenna (A'), the locating method being noteworthy in that the transceiver (10') is disconnected from the antenna (A'), and that the transceiver (10') is connected to an attenuation module (M1, M2, M3) located at a predetermined distance (L1, L2, L3) from the transceiver (10') and including an impedance (Z1, Z2, Z3) of predetermined value connected to ground, the predetermined distance (L1, L2, L3) between the transceiver (10') and the attenuation module (M1, M2, M3) and the predetermined value of the impedance (Z1, Z2, Z3) defining an area (A1, A2, A3) for locating the mobile device (T) around the vehicle (V).

12 Claims, 3 Drawing Sheets

(51) Int. Cl.
  *G01S 5/02* (2010.01)
  *G01S 7/282* (2006.01)
  *G01S 11/06* (2006.01)
  *G01S 13/74* (2006.01)
  *G01S 13/76* (2006.01)
  *H01Q 1/32* (2006.01)
  *B60R 25/24* (2013.01)

(52) U.S. Cl.
  CPC ............ *G01S 13/74* (2013.01); *G01S 13/765* (2013.01); *H01Q 1/3241* (2013.01); *H04W 4/023* (2013.01); *B60R 25/245* (2013.01)

(58) Field of Classification Search
  USPC ...... 455/129, 334, 456.1; 343/745, 787, 793
  See application file for complete search history.

(56) References Cited

U.S. PATENT DOCUMENTS

| | | |
|---|---|---|
| 2009/0015477 A1 | 1/2009 | Suzuki et al. |
| 2010/0097175 A1 | 4/2010 | Kasai et al. |
| 2012/0244877 A1 | 9/2012 | Margalef et al. |
| 2014/0240091 A1 | 8/2014 | Talty et al. |
| 2016/0169687 A1* | 6/2016 | Yu .......................... H04W 4/02 701/468 |

FOREIGN PATENT DOCUMENTS

| | | |
|---|---|---|
| CN | 204507072 | 7/2015 |
| FR | 2 841 392 A1 | 12/2003 |
| FR | 2 904 493 A1 | 2/2008 |

* cited by examiner

METHOD FOR LOCATING, VIA ULTRA HIGH FREQUENCY, A MOBILE DEVICE FOR "HANDS-FREE" ACCESS TO AN AUTOMOTIVE VEHICLE AND ASSOCIATED LOCATING DEVICE

FIELD OF THE INVENTION

The invention relates to a method for locating, via ultra high frequency, a mobile device for "hands-free" access to an automotive vehicle and an associated locating device that is on board the vehicle.

BACKGROUND OF THE INVENTION

The invention applies more particularly to systems for "hands-free" access to automotive vehicles. A system for access, referred to as "hands-free" access, to an automotive vehicle allows an authorized user to lock and/or unlock the openings of his or her vehicle without using a key. For this, the vehicle identifies a badge or remote control carried by the user and if the badge or remote control is identified as belonging to the vehicle, then the vehicle locks or unlocks its openings.

This "hands-free" access system is known to a person skilled in the art. It is generally composed of an electronic control unit on board the vehicle, one or more radiofrequency (RF) antennas located on the vehicle and an identification badge or remote control comprising an RF antenna carried by the user.

An identifier exchange between the badge and the vehicle via RF antennas allows the badge to be identified by the vehicle and locking or unlocking to be triggered by the latter.

The identifier may be contained within a portable device other than a badge or a remote control, e.g. it may be contained within a cell phone or a watch worn by the user.

The identifier exchange is generally carried out via radiofrequency (RF) waves and by low frequency (LF) waves. The vehicle first transmits, via the LF antennas, an LF interrogation signal and the badge, if it is located within the reception area of said signal, sends an RF presence message containing its identifier back to the vehicle.

The precise location of the badge around the vehicle is carried out by measuring the intensity of the LF signal, originating from the vehicle, received by the badge (via the antennas and the electronic control unit), which measurements are more commonly known as RSSI ("received signal strength indication" measurements, or measuring the power of a signal received by an antenna on reception). The measurement of the power of the signal, originating from each LF antenna, received by the badge is analyzed by a locating device on board the vehicle, which thereby determines the position of the badge with respect to said LF antennas, i.e. with respect to the vehicle.

SUMMARY OF THE INVENTION

To this end, the locating device D of the prior art comprises, as shown in FIG. 1, an electrical power supply source Vcc supplying power to a transceiver 10 that is electrically connected to at least one antenna A via an electrical line 20.

The locating device D generally comprises three to four antennas A.

This RSSI measurement allows the badge to be precisely located around and inside the vehicle in order to allow the openings to be locked/unlocked, and also the vehicle to be started, once the badge is detected inside the vehicle.

Mobile devices, e.g. cell phones, are now increasingly equipped with the Bluetooth® or Bluetooth Low Energy "BLE" communication standard, i.e. ultra high frequency (UHF) communication from 2400 MHz to 2480 MHz. This communication standard has the advantage of being universal and therefore requires no country-specific homologation (only international Bluetooth Low Energy certification), as is the case with current RF/LF communication standards whose operating frequencies vary according to the country.

It therefore becomes necessary to adapt the hands-free access system so that it may also operate with the Bluetooth® communication standard and no longer only via radio- and low frequency (RF/LF) waves.

The advantage of the Bluetooth® communication standard is that it allows a long communication range of approximately 250 m around the vehicle. However, it does not allow the presence of the mobile device to be detected at shorter distances. For example, when the mobile device is located at tens of centimeters from the vehicle and the user wishes to unlock his or her vehicle, which was possible with the communication device of the prior art operating over an exchange of RF and LF waves. Specifically, the RSSI measurement of a Bluetooth signal is very imprecise and varies greatly depending on the environment (noise, disruptions) and it is not possible to know if the device is at 5 m, 10 m, 40 m or more.

Nor is it therefore possible to start the vehicle by using Bluetooth® communication, as starting is only authorized when the mobile device is located inside the vehicle and within a few centimeters of the UHF antennas of the vehicle. However, given the long range of Bluetooth®, the detection of said mobile device within a few centimeters of the UHF antennas is not possible.

The invention proposes an ultra high frequency device for locating the mobile device allowing these drawbacks to be overcome.

More specifically, the ultra high frequency locating device according to the invention allows the presence of the mobile device to be detected at multiple distances around the vehicle, from a few centimeters to multiple meters, as well as at a few centimeters from the UHF antennas on board the vehicle, thereby making "hands-free" starting possible with the Bluetooth® communication standard, which was not possible in the prior art with said communication standard.

BRIEF DESCRIPTION OF THE DRAWINGS

Other features and advantages of the invention will become apparent upon reading the description that will follow and upon examining the appended drawings in which.

DETAILED DESCRIPTION OF THE INVENTION

Figure 1:
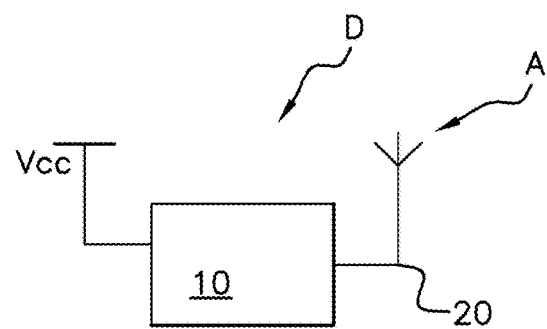
FIG. 1, explained above, diagrammatically shows the locating device D according to the prior art.
Figure 2:
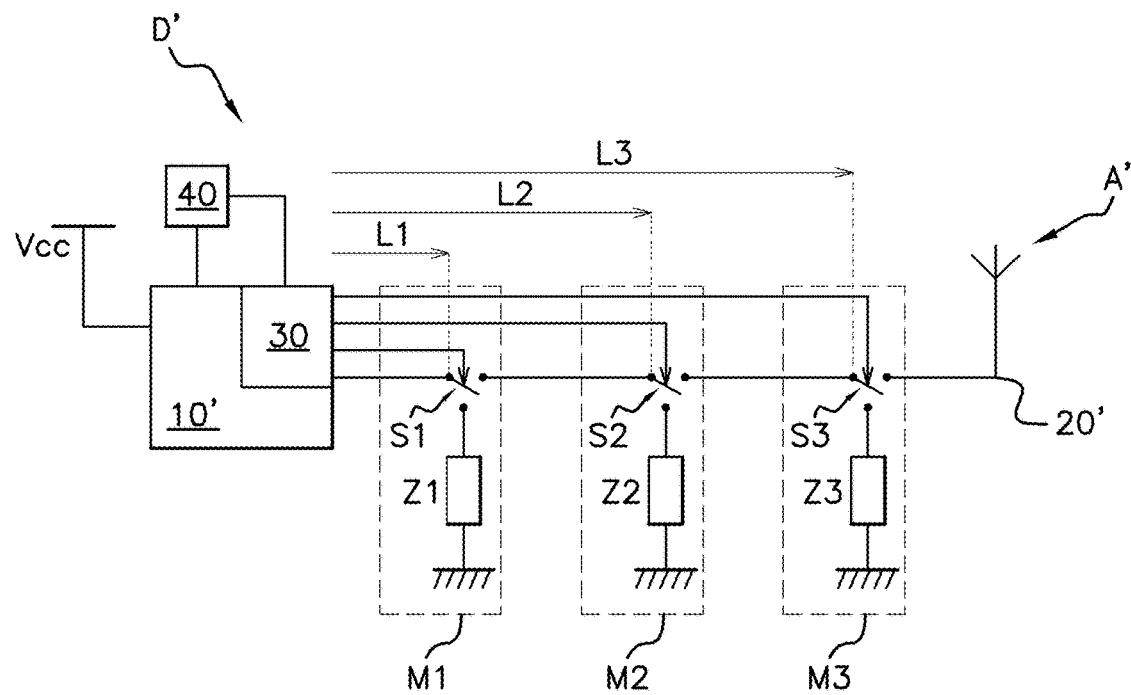
FIG. 2 diagrammatically shows the locating device D' according to the invention.

The locating device D' according to the invention is illustrated in FIG. 2. The locating device D' comprises:

an electrical source Vcc;

an ultra high frequency transceiver, more specifically a Bluetooth® transceiver 10', comprising a printed circuit board;

an antenna A'.

According to the invention, said locating device D' additionally comprises, between the transceiver 10' and the antenna A', i.e. on the (transmission/reception) electrical communication line 20' between the transceiver 10' and the antenna A', at least one attenuation module M1. Said locating device D' also comprises means 30 for controlling the attenuation module M1 and means for determining the location of the mobile device 40.

In FIG. 2, a plurality of attenuation modules located, in series, on the communication line 20' are shown: a first attenuation module M1, a second attenuation module M2 and a third attenuation module M3. As shown in FIG. 2, the locating device D' also comprises:

means 30 for controlling the plurality of attenuation modules M1, M2, M3, that are integrated, for example, in the transceiver 10', as well as means for determining the location of the mobile device 40 that are electrically connected to the transceiver 10' and to the means 30 for controlling the attenuation module.

Each attenuation module, the first attenuation module M1, the second attenuation module M2 or the third attenuation module M3, is located at a predetermined distance from the transceiver 10', in this instance at a first distance L1, a second distance L2 and a third distance L3, respectively.

Each attenuation module, the first attenuation module M1, the second attenuation module M2 or the third attenuation module M3, also comprises:

a switching means, e.g. a switch, a first switch S1, a second switch S2 and a third switch S3, respectively, and an impedance, a first impedance Z1, a second impedance Z2 and a third impedance Z3, respectively, each impedance, the first impedance Z1, the second impedance Z2 or the third impedance Z3, having a predetermined value and being electrically connected to ground.

In one preferred embodiment of the invention, the predetermined values of the first impedance Z1, the second impedance Z2 or the third impedance Z3 are all mutually equal and are between 0 and 100 kΩ, for example said impedances each have a value of 50Ω.

For each attenuation module, for the first attenuation module M1, for the second attenuation module M2 and for the third attenuation module M3, each switching means, i.e.: the first switch S1, the second switch S2 or the third switch S3, may be activated by the control means 30 in order to select one of the two following positions:

a first position in which the transceiver 10' or the preceding attenuation module (M1, M2) is disconnected from the antenna A' or from the subsequent attenuation module (M2, M3) and in which the transceiver 10' or the preceding attenuation module is electrically connected to the impedance (Z1, Z2, Z3) associated with said switching means;

a second position in which the switching means S1, S2, S3 electrically connects the transceiver 10' or the preceding attenuation module M1, M2 to the antenna A' or to the subsequent attenuation module M2, M3.

Each switching means (the first switch S1, the second switch S2 or the third switch S3) therefore allows the transceiver 10' to be disconnected from the antenna A' and the transceiver 10' to be connected to an associated attenuation module (to the first attenuation module M1, to the second attenuation module M2 or to the third attenuation module M3), i.e. the transceiver 10' to be connected to an impedance (to the first impedance Z1, to the second impedance Z2 or to the third impedance Z3) that is electrically connected to ground, has a predetermined value and is located at a predetermined distance (at a first distance L1, a second distance L2 and a third distance L3, respectively) from said transceiver 10'.

Figure 3A:
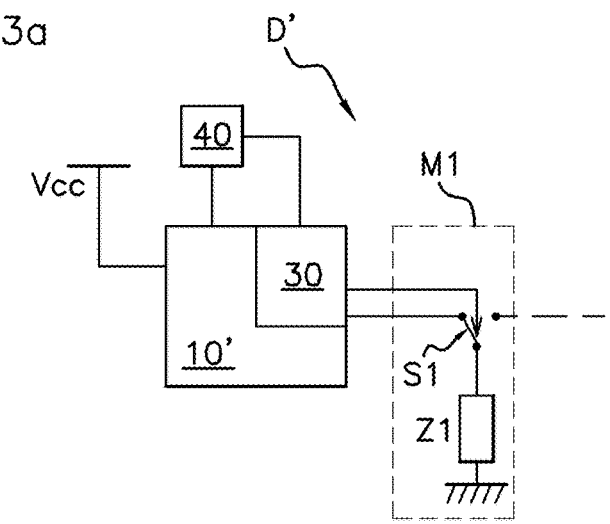
FIGS. 3a-3c diagrammatically show the areas for locating the mobile device around the vehicle, according to the invention.

For example, in FIG. 3a, the first switch S1 is in the first position and it electrically connects the transceiver 10' to the first impedance Z1 of the first attenuation module M1 that is located at a first distance L1 from the transceiver 10'. In this first configuration, the transceiver 10' transmits an ultra high frequency signal, this signal is propagated through the printed circuit board of said transceiver 10' and makes the printed circuit board resonate at said frequency. The UHF signal is also propagated through the communication line 20' up to the first impedance Z1 and then to ground. The maximum range of the UHF waves thus generated by the locating device D' depends on the first predetermined distance L1 between the first attenuation module M1 and the transceiver 10', as well as on the predetermined value of the first impedance Z1. In this first configuration, the first distance L1 and the value of the first impedance Z1 are chosen in such a way that the range of the UHF waves thus transmitted is limited to a first locating area A1 that is located within the vehicle V (cf. FIG. 4).

Figure 3B:
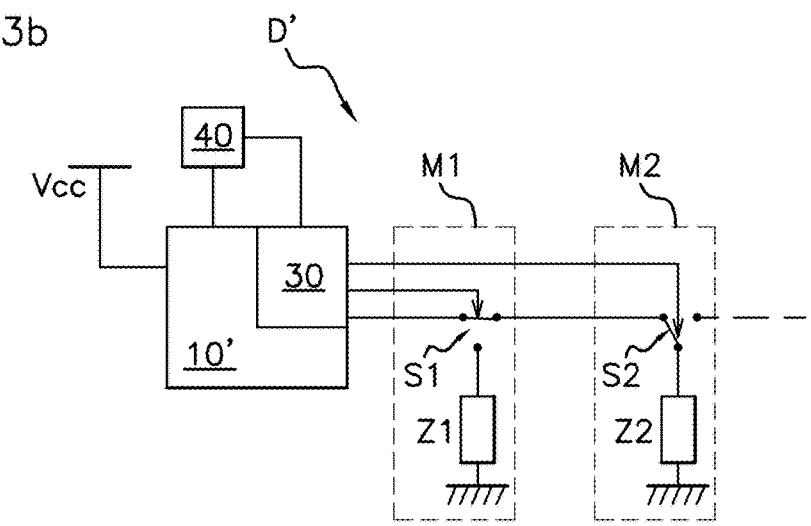

In FIG. 3b, the first switch S1 is in the second position and it electrically connects the transceiver 10' to the second attenuation module M2. As for the second switch S2, it is in the first position and it electrically connects the first attenuation module M1, itself connected to the transceiver 10', to the second impedance Z2, located at a second distance L2 from the transceiver 10'.

In this example, the value of the second impedance Z2 is equal to the value of the first impedance Z1, and the second distance L2 is greater than the first distance L1.

Figure 4:
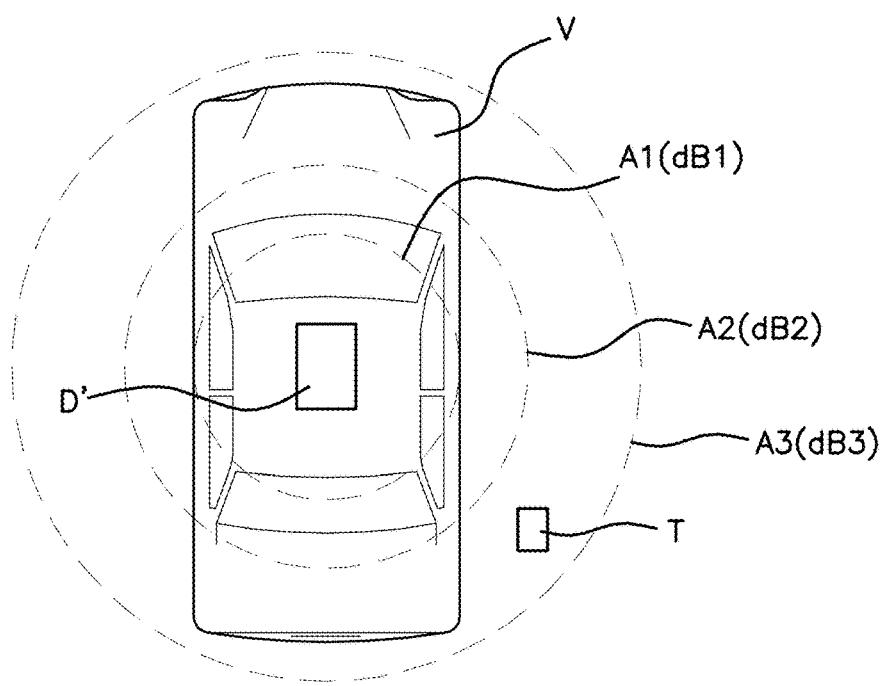
FIG. 4 shows the locating device D' in a vehicle, according to the invention.

In this second configuration of the locating device D' of the invention, the range of the UHF waves thus transmitted is longer than that of the first configuration and defines an outside area close to the vehicle V which will be referred to as the second locating area A2; said second locating area A2 is centered on the vehicle, is larger than the first locating area A1 and covers the first locating area A1 (cf. FIG. 4).

Figure 3C:
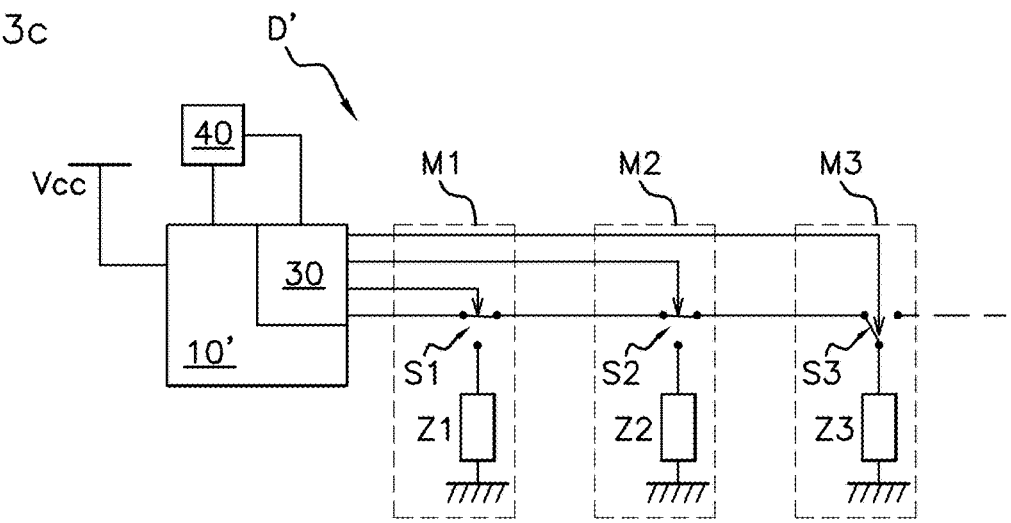

In FIG. 3c, the first switch S1 and the second switch S2 are in the second position. The second switch S2 electrically connects the second attenuation module M2, itself electrically connected to the transceiver 10' via the first switch, to the third impedance Z3. The third switch S3 is in the first position and it electrically connects the second attenuation module M2 (i.e. the transceiver 10') to the third impedance Z3, located at a third distance L3 from the transceiver 10'.

In this example, the value of the third impedance Z3 is equal to the value of the second impedance Z2, and the third distance L3 is greater than the second distance L2.

In this third configuration of the locating device D' of the invention, the range of the UHF waves thus transmitted is longer than that of the second configuration and defines a third locating area A3, i.e. an area centered on the vehicle, larger than the second locating area A2 and covering the first and second locating areas A1 and A2 (cf. FIG. 4).

Of course, a fourth configuration consists of flipping all of the switches (S1, S2, S3) to the second position, in which case the transceiver 10' is connected to the antenna A' and the transmission range of the locating device D' is at maximum, equal to the range of Bluetooth®.

Of course, the values of the first, second and third impedances Z1, Z2, Z3 may be different to one another depending on the desired dimensions of the locating areas.

In FIG. 4, solely by way of example, a mobile device (T), e.g. a cell phone, is located within the third locating area A3.

When the locating device D' is in the third configuration and transmits an identification request via UHF waves, the mobile device (T) located in the third locating area A3 receives the identification request originating from the transceiver 10' and in turn sends its identifier back to said transceiver 10'.

The identifier received by the transceiver is transmitted to the means for determining the location 40 of the mobile device T. As said determining means 40 are connected to the control means 30, said determining means receive information regarding the configuration of the locating device D', more particularly the position of the switching means and consequently the targeted locating area, in this case the third locating area A3. If the received identifier is validated (if it corresponds to an identifier of a mobile device T that is paired with the vehicle V) then said locating means 40 deduce that the mobile device T is present in the third locating area A3.

The control means 30, the transceiver 10' and the determining means 40 may be software means that are integrated in a control unit (not shown) of BCM (body control module) type.

Figure 5:
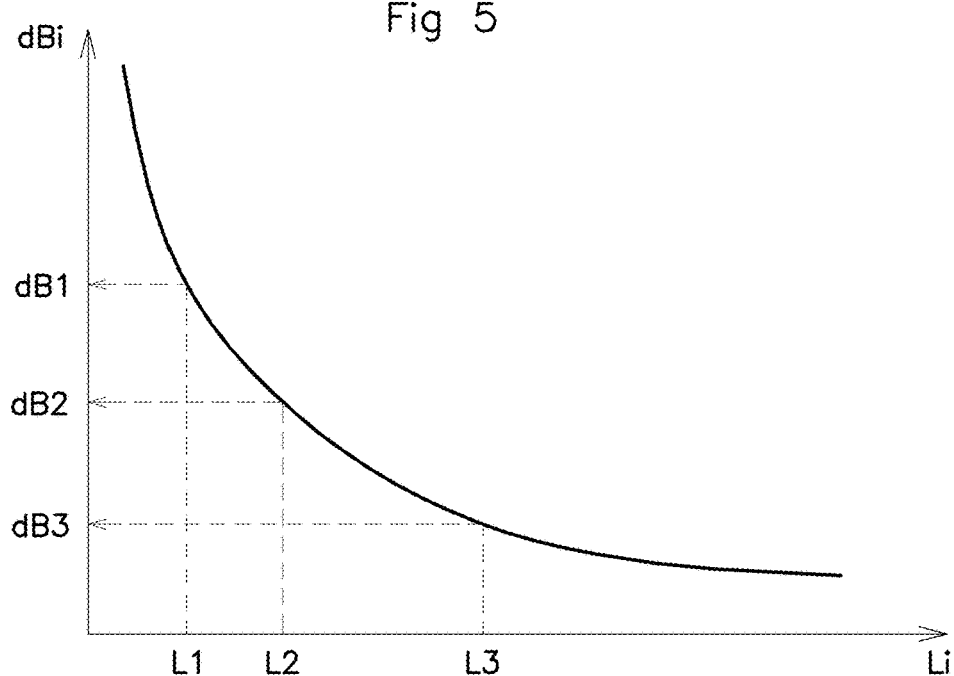
FIG. 5 shows a graphical representative of the attenuation of UHF waves in decibels (dBi) according to distance (Li).

FIG. 5 is a graphical representation of the attenuation of the UHF waves in decibels (dBi) according to each distance (Li), the first distance L1, the second distance L2 or the third distance L3 (between the transceiver 10' and the first attenuation module M1, the second attenuation module M2 or the third attenuation module M3). Each distance (L1, L2, L3) corresponds to an attenuation of the UHF waves (dB1, dB2, dB3) and a locating area (A1, A2, A3) of the mobile device.

The attenuation dBi of the UHF waves according to the distance Li is given by the following formula:

$$DBi = A \times \ln(Li) + B$$

or equally:

$$Li = e^{\left(\frac{(DBi-B)}{A}\right)}$$

where:

$$B = \frac{C}{4 \times f \times \sqrt{\frac{\varepsilon_{PCB} + \varepsilon_{AIR}}{2}}}$$

Li: predetermined distance
DBi: attenuation in decibels
A: coefficient greater than zero
f: transmission frequency
$\varepsilon_{PCB}$: the relative permittivity of the printed circuit board of the locating device D'
$\varepsilon_{AIR}$: the permittivity of air
C: celerity.

The first distance L1 corresponds to a first strong attenuation dB1 of the range of the transmitted UHF waves and therefore a first locating area A1.

The second distance L2 corresponds to a second attenuation dB2, weaker than the first attenuation, defining a second locating area A2 that is larger than the first locating area A1.

The third distance L3 corresponds to a weak attenuation dB3 of the range of the waves and therefore a third locating area A3 that is larger than the second locating area A2.

We therefore have:

$$A1 < A2 < A3$$

and:

$$L1 < L2 < L3$$

with:

$$Z1 = Z2 = Z3$$

For example, if Z1=Z2=Z3=50Ω, and by making:
L1=2 mm
L2=10 mm
L3=30 mm then the maximum range of the UHF waves for each locating area is approximately equal to:
 The range of the first locating area A1 is equal to 1 meter.
 The range of the first locating area A2 is equal to 5 meters.
 The range of the first locating area A3 is equal to 10 meters.

The locating device D' of the invention therefore allows the mobile device T to be located, via ultra high frequency waves, i.e. via Bluetooth®, in at least one locating area A1 by disconnecting the transceiver 10' from the antenna A' and by connecting said transceiver 10' to an attenuation module (M1, M2 or M3) located at a predetermined distance (L1, L2 or L3) from the transceiver 10' and comprising an impedance (Z1, Z2, Z3) of predetermined value connected to ground. The predetermined distance (L1, L2, L3) between the transceiver 10' and the attenuation module M1, M2, or M3, along with the predetermined value of the impedance Z1, Z2, Z3, define an area A1, A2, A3 for locating the mobile device T around the vehicle V.

In one preferred embodiment, the locating device D' comprises a plurality of attenuation modules M1, M2, M3.

In this preferred embodiment, the plurality of attenuation modules M1, M2, M3 allows the predetermined distance between the transceiver 10' and the attenuation module (M1, M2, M3) and/or the predetermined value of the impedance Z1, Z2, Z3 to be made to vary in order to define multiple areas A1, A2, A3 for locating the mobile device T around the vehicle V, i.e. multiple UHF wave transmission areas with different dimensions in order to precisely locate the mobile device T around or inside the vehicle V.

The invention therefore ingeniously allows the range of the ultra high frequency (Bluetooth®) waves to be "downgraded" from a maximum range in the prior art of 250 m to roughly a few centimeters, in order to precisely define areas for locating a mobile device T inside and around a vehicle V. With the locating method of the invention, locating a mobile device inside a vehicle via Bluetooth® in order to authorize "hands-free" starting is now possible.

The invention claimed is:

1. A method for locating, via ultra high frequency, a mobile device for hands-free access to a vehicle, via a locating device on board the vehicle, said locating device comprising an electrical power supply source, and an ultra high frequency transceiver connected to an antenna via an electrical communication line, said locating method comprising:

disconnecting the transceiver from the antenna; and
connecting the transceiver to an attenuation module located at a predetermined distance from the transceiver on the electrical communication line and comprising an impedance of predetermined value connected to ground, the predetermined distance between the transceiver and the attenuation module and the predetermined value of the impedance corresponding to an attenuation of ultra high frequency waves and defining an area for locating the mobile device around the vehicle.

2. The locating method as claimed in claim 1, wherein the predetermined distance between the transceiver and the attenuation module and/or the predetermined value of the impedance varies in order to define multiple areas for locating the mobile device around the vehicle.

3. A device for locating, via ultra high frequency, a mobile device for hands-free access, said locating device being on board an automotive vehicle and comprising:
   an electrical power supply source;
   an ultra high frequency transceiver, comprising a printed circuit board connected to an antenna via an electrical communication line;
   on the electrical communication line, at least one attenuation module that is located at a predetermined distance from the transceiver, the at least one attenuation module comprising
   a switch, and
   an impedance of predetermined value, connected to ground, the predetermined distance between the transceiver and the at least one attenuation module along with the predetermined value of the impedance corresponding to an attenuation of ultra high frequency waves and defining an area for locating the mobile device around the vehicle;
   a controller configured to control the at least one attenuation module;
   a hardware location determining device configured to determine the location of the mobile device, the hardware location determining device being configured to electrically connected to the transceiver and to the controller,
   wherein the switch has
      a first position in which the transceiver is disconnected from the antenna and is electrically connected to the impedance associated with the switch, and;
      a second position in which the switch electrically connects the transceiver to the antenna.

4. The locating device as claimed in claim 3, further comprising:
   on the electrical communication line, the at least one attenuation modules includes a plurality of attenuation modules in series,
   wherein the controller is configured to control said attenuation modules,
   a hardware location determining device configured to determine the location of the mobile device, the hardware location determining device being configured to electrically connected to the transceiver and to the controller,
   each attenuation module being located at a respective predetermined distance from the transceiver, each attenuation module comprising a switch and an impedance of predetermined value that is connected to ground, each of the switches having:
      a first position in which the transceiver or a first one of attenuation modules that is connectable to the switch is disconnected from the antenna and is electrically connected to the impedance associated with said switch, and
      a second position in which the switch electrically connects the transceiver or the first attenuation module to the antenna or to a second one of the attenuation modules that is connectable to the switch.

5. The locating device as claimed in claim 4, wherein the predetermined distance between the transceiver and the attenuation module is given by:

$$Li = e^{\left(\frac{DBi - B}{A}\right)}$$

where:

$$B = \frac{C}{4 \times f \times \sqrt{\frac{\varepsilon_{PCB} + \varepsilon_{AIR}}{2}}}$$

Li: predetermined distance (mm)
DBi: attenuation (dB)
A: coefficient greater than zero
f: transmission frequency
$\varepsilon_{PCB}$: the relative permittivity of the printed circuit board of the locating device
$\varepsilon_{AIR}$: the permittivity of air, and
C: celerity.

6. The locating device as claimed in claim 5, wherein the predetermined value of the impedance is between 0 and 100 kΩ.

7. An automotive vehicle comprising:
   the ultra high frequency locating device as claimed in claim 5.

8. The locating device as claimed in claim 4, wherein the predetermined value of the impedance is between 0 and 100 kΩ.

9. An automotive vehicle comprising:
   the ultra high frequency locating device as claimed in claim 4.

10. The locating device as claimed in claim 3, wherein the predetermined value of the impedance is between 0 and 100 kΩ.

11. An automotive vehicle comprising:
   the ultra high frequency locating device as claimed in claim 10.

12. An automotive vehicle comprising:
   the ultra high frequency locating device as claimed in claim 3.

* * * * *